United States Patent
Yamaguchi

(12) 
(10) Patent No.: US 6,208,034 B1
(45) Date of Patent: Mar. 27, 2001

(54) POWER OUTPUT DEVICE AND CONTROL METHOD OF THE POWER OUTPUT DEVICE AND HYBRID VEHICLE DRIVEN BY THE POWER OUTPUT DEVICE

(75) Inventor: Katsuhiko Yamaguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/288,657

(22) Filed: Apr. 9, 1999

(30) Foreign Application Priority Data

Jul. 13, 1998 (JP) .................................. 10-214909

(51) Int. Cl.[7] .................. F02N 11/06; H02P 9/04
(52) U.S. Cl. .................. 290/40 C; 290/40 A; 290/40 B; 290/401 D; 290/40 E; 290/40 F; 180/65.2
(58) Field of Search ........................ 290/40 A–E

(56) References Cited

U.S. PATENT DOCUMENTS

| 4,335,429 | * | 6/1982 | Kawakatsu | 364/424 |
| 5,343,970 | * | 9/1994 | Severinsky | 180/65.2 |
| 5,698,905 | * | 12/1997 | Ruthlein | 290/32 |
| 5,865,263 | * | 2/1999 | Yamaguchi et al. | 180/65.2 |
| 6,054,776 | * | 4/2000 | Sumi | 290/17 |
| 6,067,801 | * | 5/2000 | Harada et al. | 60/705 |

* cited by examiner

Primary Examiner—Elvin Enad
(74) Attorney, Agent, or Firm—Oliff & Berridge, PLC.

(57) ABSTRACT

A power output device is provided with an internal combustion engine having an output shaft, an electric motor for generating and receiving electric power and for rotating a rotation shaft, a drive shaft mechanically connected to the output and the rotation shaft, and a battery for supplying electric power to the electric motor and storing electric power from the electric motor. When a vehicle mounting the power output device drives normally, a target torque of the motor is determined by the PI (Proportional Integral) control. When the vehicle drives with the engine stopping or idling, however, a target torque is determined to be substantially zero. Then an electric power for the control of the electric motor is prevented from being consumed. While such a control is executed, a target torque of the electric motor is determined by the PI control when the drive shaft is locked. Consequently, even when the drive shaft is locked, the rotation speed of the engine is kept to be substantially constant. Then such problems as a resonance and etc. of the power output device can be avoided and the vehicle drives stably.

9 Claims, 8 Drawing Sheets

POWER OUTPUT DEVICE AND CONTROL METHOD OF THE POWER OUTPUT DEVICE AND HYBRID VEHICLE DRIVEN BY THE POWER OUTPUT DEVICE

BACKGROUND OF THE INVENTION

1. Field of the Invention

The present invention relates to a power output device comprising an internal combustion engine and at least an electric motor connected to the engine mechanically, and more particularly a method of controlling the power output device, and a hybrid vehicle having the power output device.

2. Description of Related Art

In recent years a hybrid vehicle having an internal combustion engine and at least one electric motor has been proposed. In such a hybrid vehicle, several kinds of structures were proposed. One of them is called a parallel hybrid vehicle. In such a parallel hybrid vehicle, mechanical power transmitted from the internal combustion engine and/or electric power generated by the electric motor can be transmitted to a wheel shaft of the hybrid vehicle.

The hybrid vehicle can be driven, even when the engine is sometimes not working or in an idling-condition. When the engine stops or is in an idling-condition and the hybrid vehicle is being driven, the torque outputted from the engine is substantially zero. If a speed of the vehicle and a target rotation speed of the engine is given, a target rotation speed of the electric motor is determined. The necessary torque for keeping the rotation speed of the electric motor in the target rotation speed is outputted by the proportional integration control. The present rotation speed of the electric motor is detected by a sensor. If the rotation speed is less than the target rotation speed, a positive torque of the electric motor is provided in order to increase the rotation speed of the electric motor. On the contrary, if it is more than the target rotation speed, a load is added to the electric motor in order to reduce the rotation speed. On the other hand, a throttle opening angle and/or fuel injection to the engine are controlled so that a predetermined idling rotation speed of the engine is maintained.

The rotation speed of the electric motor sensed by the sensor has a detected error or a fluctuation caused by backlashes of gears installed in a power train of this power output device, or vibration of the vehicle. Furthermore the rotation speed of the engine fluctuates. Consequently, during the above-mentioned control, an electric current is fed substantially consecutively for correcting the fluctuation of the rotation speed of the electric motor. The electric motor consumes electric power on one occasion, and on another occasion regenerates by the aforementioned control. If the electric power continues to be consumed when the engine does not output power substantially, a battery storage may run out of electricity. On the contrary if the regeneration of the electric motor continues, the battery may be overcharged. Furthermore even during the stopping condition of the engine, such a phenomena above mentioned could occur by controlling the electric motor in response to vibrations of the hybrid vehicle. Furthermore in special cases the electric motor could rotate the engine, though the engine needs not rotate.

The rotation speed detected by the sensor used in the control of the electric motor may happen to be inconsistent with the rotation speed detected by a sensor in control of the engine. This inconsistency is caused by the discrepancy of the characteristics or the detecting cycles between the two above-mentioned sensors. By this inconsistency, the electric motor could continue to consume or to regenerate electric power. For example, when the rotation speed of the electric motor is higher than the target rotation speed, the electric motor is controlled to reduce the rotation speed through the regeneration of the electric motor. If the detected rotation speed of the engine is lower than the target rotation speed when the rotation speed of the electric motor converges to the target rotation speed, the engine is controlled to increase the rotation speed. Then the rotation speed of the electric motor is higher than the target rotation speed and the electric motor begins to regenerate again. By these reiterations of the control of the electric motor and the engine, the electric motor continues the regenerating operation. This phenomenon is one of the problems relating to a mutual intervention between the control of the electric motor and the engine.

Furthermore, another problem caused by the mutual intervention occurs as follows. The operating condition of the electric motor can not sufficiently follow a fluctuation of the rotation speed of the engine, because a control usually entails a time delay. Such a time delay causes a fluctuation of the rotation speed of the engine. When the engine is in an idling-condition, the rotation speed of the engine is controlled to be at a predetermined idling rotation speed. This control has, of course, a time delay. Consequently the operating condition of the engine happens to be very unstable by the mutual effects of the time delays of both controls. When a positive torque is outputted to the electric motor and results in the rotation speed of the engine being higher than the idling rotation speed, the amount of fuel injected into the engine could be expected to be reduced and the rotation speed of the engine could be expected to converge with the predetermined idling rotation speed. The rotation speed of the engine, however, could happen to be lower than the idling rotation speed, because the torque of the electric motor lowers.

When the engine does not output torque substantially and the electric motor is feedback-controlled, the above-mentioned problems occur in the conventional hybrid vehicle which have an internal combustion engine, an electric motor, and a drive shaft mechanically connected together.

SUMMARY OF THE INVENTION

It is thus an object of the present invention to solve the aforementioned problems. It provides a hybrid type power output device in which an output shaft of an internal combustion engine, a rotation shaft of an electric motor, and a drive shaft are mechanically connected together. It is an object to provide a device and a method by which a stable operating condition is achieved even though the engine does not output torque substantially. And it is also an object to provide a hybrid vehicle having the power output device.

To achieve at least a part of the aforementioned objects, a, power output device of the present invention, a method of the output device and a hybrid vehicle driven by the power output device provide a solution, and will now be described.

The power output device of the present invention may include an engine having an output shaft, an electric motor for generating and receiving electric power and for rotating a rotation shaft, a drive shaft mechanically connected to the output shaft of the engine and the rotation shaft of the electric motor for rotating at the same rotation speed as or a different rotation speed from, the output shaft, a battery for supplying electric power to the electric motor and storing electric power from the electric motor, a torque determinater for determining output torque of the engine and for relating the output torque to a requested power, an electric motor controller that feedback-controls said electric motor so that the output power from said drive shaft is equal to said requested power, and a second electric motor controller that controls said electric motor so that the output torque of said electric motor is substantially zero and unrelated to said electric motor controller when the output torque of said internal combustion engine is substantially zero.

In this power output device, when the output torque of the engine is substantially zero, the output torque of the electric motor is not feedback-controlled and a torque of substantially zero is set. The case that output torque of the engine is substantially zero occurs, for instance, when the engine is not working or when the engine is idling. In these occasions if the output torque of the electric motor is set to substantially zero, the electric motor is prevented from motoring or generating. As a result, several problems relating to the control of the electric motor can be avoided. That is, the instability of the operating condition of the power output device caused by the mutual intervention of the controls of the engine and the electric motor, and the over-charge or over-discharge of the battery can be avoided.

In a power output device of this present invention, it is also possible that the power output device includes a prevention determinater which determines whether or not an operating condition of the engine should be avoided on the basis of the operating condition of the engine, the electric motor and the drive shaft, wherein the second electric motor controller controls the electric motor so that the output torque of the electric motor is substantially zero when the output torque of the engine is substantially zero and the operating condition of the engine does not need to be avoided.

In this power output device, the condition that the output torque of the electric motor is set to be substantially zero is limited when the operating condition of the engine is not in an avoided area. Such an avoided condition should be considered, e.g. when the rotation speed of the engine is too low and unstable, or when the engine rotates in the reverse direction, or when a torsional resonance occurs. A phenomenon of the torsional resonance is caused by the mutual intervention between the rotation of the engine and a torsional vibration of a damper which is deposited on a crank shaft of the engine. By considering the operating condition of the engine and by adopting an appropriate contrivance, a more stable operating condition of this power output device can be achieved.

Whether an operating condition of the engine should be avoided or not is determined by several kinds of methods. In one method, e.g. the above-mentioned prevention determinater includes rotation detecting means for detecting rotation speed of said drive shaft and prevention determining means for determining whether or not an operating condition of the engine should be avoided on the basis of the operation speed of the engine.

As mentioned above, the operating condition of the engine which, should be avoided is the condition which causes a resonance or a reverse rotation. These conditions can be determined by the rotating condition of the engine. Since the rotating condition of the engine correlates to the rotating condition of the drive shaft, the operating condition of the engine is determined by the rotating condition of the drive shaft. Then the operating condition of the engine can be determined on the basis of the rotating condition of the drive shaft by the aforementioned prevention determinater. A fluctuation of the rotation speed of the drive shaft could cause the operating condition which should be avoided. Consequently the determination of the operating condition of the engine on the basis of the rotation speed of the drive shaft has an advantage, that is, a time delay becomes minimum and an appropriate determination can be done. If a damper is installed in the power train, this determination method of the operating condition of the engine based on the rotation speed of the drive shaft is especially highly effective, because a fluctuation of the rotation speed of the engine occurs with a time delay caused by a fluctuation of the rotation speed of the drive shaft.

Incidentally in the prevention determinater, whether the rotation speed of the drive shaft ranges within the predetermined value or not can be a criterion. This predetermined value can be given experimentally or analytically by obtaining the rotation speed of the drive shaft at the time of the avoided operating condition of the engine on the basis of the correlation between the rotation speed of the drive shaft and the engine. Another method is possible, that is a determination on the basis of the percentage of change of the rotation speed of the drive shaft.

Furthermore the prevention determinater as follows is possible. The prevention determinater determines the operating condition of the engine to be avoided until a predetermined time passes after the rotation speed of the engine departs from the rotation speed to be avoided once the operating condition of the engine is determined to be avoided.

Just after the rotation speed of the drive shaft is not within the above-mentioned predetermined range, the rotating condition of the engine is highly possible to be in the avoided condition again. Consequently by the above-mentioned prevention determinater such a possibility as entering into the avoided condition is prevented with more reliability.

Several kinds of a mechanical connection of this power output device can be given, for example, the output shaft of the engine, the rotation shaft of the electric motor, and the drive shaft are connected mechanically together through a planetary gear.

In this case it is not necessary that the above-mentioned three shafts are coupled to the three rotating shafts of the planetary gear respectively. Furthermore belts or chains can be adopted to connect the output shaft of the engine, the rotation shaft of the electric motor, and the drive shaft mechanically instead of the planetary gear.

The present invention is achieved by a control method of a power output device as follows. That is, a power output device has an engine with an output shaft; an electric motor for generating and receiving electric power and for rotating a rotation shaft; a drive shaft mechanically connected to the output shaft of the engine and the rotation shaft of the electric motor for rotating at the same rotation speed as or a different rotation speed from the output shaft; and a battery for supplying electric power to the electric motor and for storing electric power from the electric motor. The control method of the power output device has processes as follows: determining output torque of the engine and relating the output torque to a requested power; feedback-controlling the electric motor so that the output power from the drive shaft is equal to the requested power; and controlling the electric motor so that the output torque of the electric motor is substantially zero when the output torque of the engine is substantially zero.

In the control method the following processes are also possible. That is the control method further comprising:

detecting a parameter indicating the operating condition of the power output device;

determining whether or not an operating condition of the engine should be avoided on the basis of the parameter;

controlling the electric motor so that the output torque of the electric motor is substantially zero when the output torque of the engine is substantially zero and an operating condition of the engine does not need to be avoided.

Mounting this power output device on a vehicle creates a hybrid vehicle described as follows:

That is, a hybrid vehicle with a wheel shaft driven by a power output device comprising:

an engine having an output shaft;

an electric motor for generating and receiving electric power and for rotating a rotation shaft;

a drive shaft connected to the wheel shaft and mechanically connected to the output shaft of the internal combustion engine and the rotation shaft of the electric motor for rotating at the same rotation speed as or a different rotation speed from the output shaft;

a battery for supplying electric power to the electric motor and storing electric power from the electric motor;

a torque determiner for determining output torque of the engine and for relating the output torque to a requested power;

an electric motor controller that feedback-controls the electric motor so that the output power from the drive shaft is equal to the requested power;

a lock determiner that determines whether the wheel shaft is locked or not; and a second electric motor controller that controls the electric motor so that the output torque of the electric motor is substantially zero when the output torque of the engine is substantially zero.

Furthermore, a hybrid vehicle described as follows is also possible. That is, a hybrid vehicle installing a power output device further comprising a prevention determiner that determines whether or not an operating condition of the engine should be avoided on the basis of the operating condition of the engine, the electric motor, and the drive shaft, wherein the second electric motor controller controls the electric motor so that the output torque of the electric motor is substantially zero when the output torque of the engine is substantially zero and the operating condition of the engine does not need to be avoided.

The aforementioned drive shaft of the power output device is coupled to the wheel shaft through the differential gear. Consequently the operating condition of the engine is determined by detecting the rotation speed of the wheel shaft. The condition of the above-mentioned lock occurs when the rotation speed of the wheel shaft is substantially zero. Incidentally the determination whether the wheel shaft is locked or not is determined not only by the method of detecting the rotation speed of the wheel shaft, but also by other methods. For example it can be determined on the basis of the torque of the wheel shaft, because the torque goes down when the wheel shaft is locked. In a vehicle installing a control system of detecting the lock of wheels, e.g. an anti-lock brake system, it is also possible to use an output signal from such a system as the anti-lock brake system.

BRIEF DESCRIPTION OF THE DRAWINGS

The above and other objects, features, advantages and technical and industrial significance of this invention will be better understood by reading the following detailed description of a presently preferred embodiment of the invention, when considered in connection with the accompanying drawing, in which.

DESCRIPTION OF THE PREFERRED EMBODIMENTS

In the following and the accompanying drawings, the present invention will be described in more detail in terms of an embodiment.

(1) Structure of The Embodiment

Figure 1:
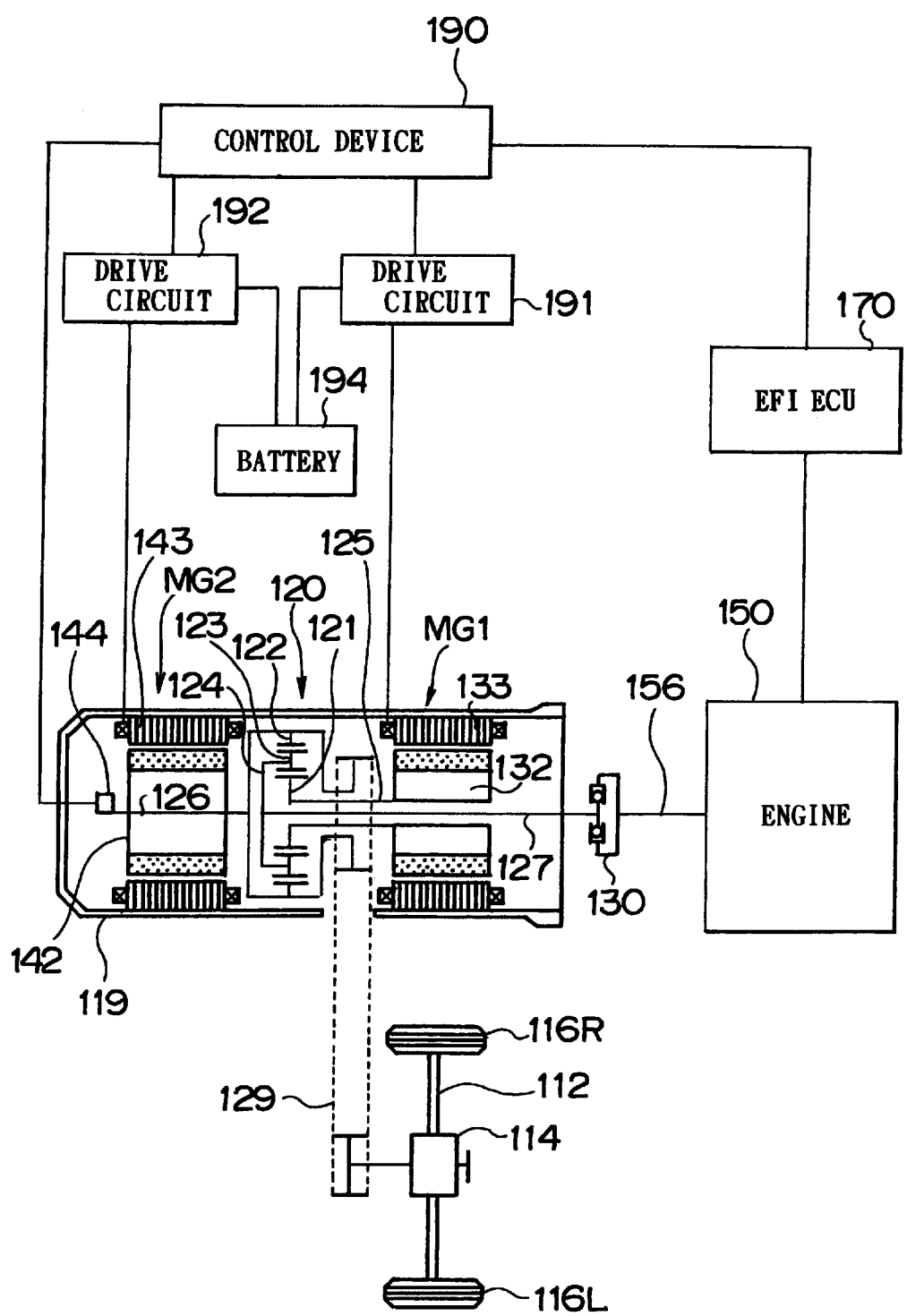
FIG. 1 is a schematic illustration of the overall structure of a power output device which is mounted to a hybrid vehicle.

First, FIG. 1 shows the structure of the power output device which is mounted on a hybrid vehicle according to the embodiment. An internal combustion engine 150 (hereinafter called engine 150) included in the power output device is usually a gasoline type engine and rotates a crankshaft 156. An operation of the engine 150 is controlled by EFIECU 170. In the EFIECU 170, a one-chip microcomputer including a CPU, ROM, RAM, etc. are provided and the CPU executes fuel injection control of the engine 150 and/or other things. Although not shown in FIG. 1, several kinds of sensors detecting the operating condition of the engine 150 are connected to the EFIECU 170 to enable the above-mentioned control.

Electric motors MG1 and MG2 are also provided in this power output device. The electric motors MG1, MG2 are respectively synchronous electric motors for generating and receiving electric power and are provided with a rotor 132 and a stator 133, and with a rotor 142 and a stator 143 respectively. Rotors 132, 142 of the electric motors MG1, MG2 respectively have a plurality of permanent magnets on an outer peripheral surface thereof, and a three-phase coil forming a revolving magnetic field is wound around the each stator 133, 143 which is fixed to a case 119. The three-phase coil winding around respective stators 133 and 143 are connected to a battery 194 through a drive circuits 191 and 192 respectively. Each drive circuit 191, 192 is a transistor-inverter which has two transistors as switching elements respectively for one set of each phase of the three-phase coil. The drive circuits 191 and 192 are connected to a control device 190. When the transistors in the drive circuits 191, 192 are switched on by the signal of the control device 190, electric current flows between the battery 194 and the electric motors MG1, MG2, or between the battery 194 and one of the electric motors MG1, MG2. The electric motor MG1, MG2 can operate as motors which rotate by receiving electric power from the battery 194 (this operating condition is called motoring). And they can operate as a generator which generates electric power on both ends of the three-phase coil and charges the battery 194 when the rotors 132, 142 are rotated by the eternal force.

The electric motors MG1, MG2, and the engine 150 are connected mechanically through a planetary gear 120. The planetary gear 121) comprises a sun gear 121, a ring gear 122, and a planetary carrier 124 having a plurality of planetary pinions 123. In the hybrid vehicle of this embodiment, the crank shaft 156 of the engine 150 is coupled to the a planetary carrier shaft 127 through a damper 130. The planetary carrier shaft 127 is coupled to the planetary carrier 124. The damper 130 absorbs a torsional vibration which occurs on the crank shaft 156. The rotor 132 of the electric motor MG1 is coupled to a hollow sun gear shaft 125. The sun gear shaft 125 is coupled to the sun gear 121 disposed at the center circle of the planetary gear 120. The rotor 142 is coupled to a ring gear shaft 126. The ring gear shaft 126 is coupled to the ring gear 122 and coaxial with the carrier shaft 127. The ring gear 122 rotates at the outer circle of the planetary gear 120. The planetary pinions 123 are disposed between the sun gear 121 and the ring gear 122 and rotate while moving along the outer circumference of the sun gear 121. The planetary carrier supports a rotational shaft of each planetary pinion 123. The rotation of the ring gear 122 is transmitted to wheels 116R and 116L through a chain belt 129, a differential gear 114 and a wheel shaft 112. Wheels 116R and 116L, are coupled to the wheel shaft 112.

In order to explain the basic movement of the hybrid vehicle, a movement of the planetary gear 120 is described hereinafter. The planetary gear 120 has the following characteristic. After the rotation speeds and torque values (hereinafter called 'rotating condition') of two rotating shafts among three rotating shafts as mentioned above have been determined, the rotating condition of the remaining rotating shaft is uniquely determined. The relationship of each rotating condition of each rotating shaft can be given by a mathematical expression which is well known in mechanics. At the same time, it can be represented in the form of a collinear graph geometrically.

Figure 2:
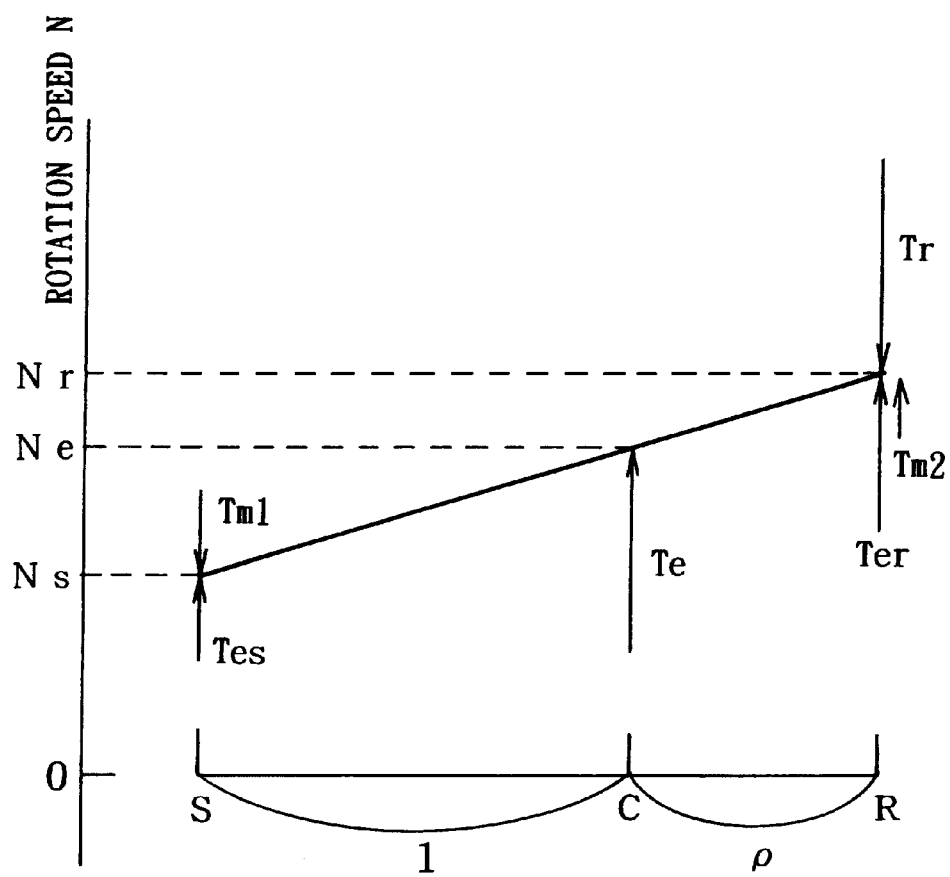
FIG. 2 is a collinear graph showing the relationship among the rotation speeds and torque values of the three rotating shafts coupled to the planetary gear in FIG. 1.

One example of the aforementioned collinear graph is shown in FIG. 2. The vertical line shows a rotation speed N of each rotating shaft. The horizontal line shows the relation of the gear ratio of each gear according to the distance from each other. That is, a coordinate axis S of the sun gear shaft 125 is located at one end and a coordinate axis R of the ring gear shaft 126 is located at the other end. A coordinate axis C of the carrier shaft 127 is defined as a shaft that interior-divides a line segment formed by the coordinate shafts S, R with the ratio of 1: ρ. ρ represents a ratio of the number of teeth of the sun gear 121 (Zs) to the number of teeth of the ring gear 122 (Zr). Onto the coordinate axis S, C, R defined in these ways, the rotation speeds Ns, Nc and Nr of respective gear shafts are plotted. The planetary gear 120 has a characteristic that these three plotted points are on one straight. line. This straight line is called an operational co-line. If two points are given, the operational co-line is uniquely determined. Consequently if the rotation speeds of the two rotating shafts are given, the rotation speed of the remaining rotating shaft among the three rotating shafts is determined using the operational co-line.

Subsequently, the planetary gear 120 also has a characteristic as follows. When torque applied to each rotating shaft is replaced with each applied force to the operational co-line, the operational co-line can be treated as a rigid body to which a vectorial force is applied. As an actual example, torque Te applied to the carrier shaft 127 of the planetary gear 120 is given. In this case, the corresponding valued force to the torque Te is applied to the operational co-line from the bottom to the top vertically. The enforced direction to the operational co-line is determined according to the direction of the torque Te. At the same as the aforementioned torque Te, the corresponding valued force to the torque Tr outputted from the ring gear shaft 126 is applied to the operational co-line from the bottom to the top vertically. The torques Tes and Ter in the FIG. 2 are the divided value of the torque Te on the basis of the division formula of applied forces to the rigid body. Therefore Tes={ρ/(1+ρ)}Te, and Ter={1/(1+ρ)}Te. Considering the condition that forces are balanced on the operational co-line as a rigid body when the above mentioned forces are applied, the torque Tm1 applied to the sun gear shaft 125 and the torque Tm2 applied to the ring gear shaft 126 are determined. The torque Tm1 is equal to the torque Tes, and torque Tm2 is equal to the balance between the torque Tr and Ter.

The movement of the planetary gear 120 was explained above using the collinear graph in FIG. 2. The hybrid vehicle of this embodiment can be driven under various conditions on the basis of the working of the planetary gear 120. For example, when the planetary carrier shaft 127 is rotated by the engine 150, the sun gear shaft 125 and the ring gear shaft 126 rotate, as clearly shown in the collinear graph in FIG. 2. The rotation power of the ring gear shaft 126 is transmitted to the wheels 116R, 116L. The rotation power of the sun gear shaft 125 can be regenerated as electric power by the electric motor MG1. And if the electric motor MG2 is motoring, the power from the electric motor MG2 is given to the wheels 116R, 116L through the ring gear shaft 126. When the torque transmitted to the ring gear shaft 126 from the engine 150 is insufficient, the torque by the motoring of the electric motor MG2 is supplemented. The electric power stored in the battery 149 and/or generated by the electric motor MG1 is adopted for the motoring of the electric motor MG2. Controlling the operating condition of the electric motors MG1, MG2 yields various kinds of rotating conditions. That is, rotation speeds and torque values can be converted and given to the wheel shaft 112.

The hybrid vehicle in this embodiment can be driven while the engine 150 stops. In the rather slow speed condition just after the vehicle starts, the electric motor MG2 is in the condition of motoring and power is transmitted to the wheel shaft 112 while the engine 150 is not working. The vehicle sometimes can be driven while the engine 150 is idling.

Figure 5:
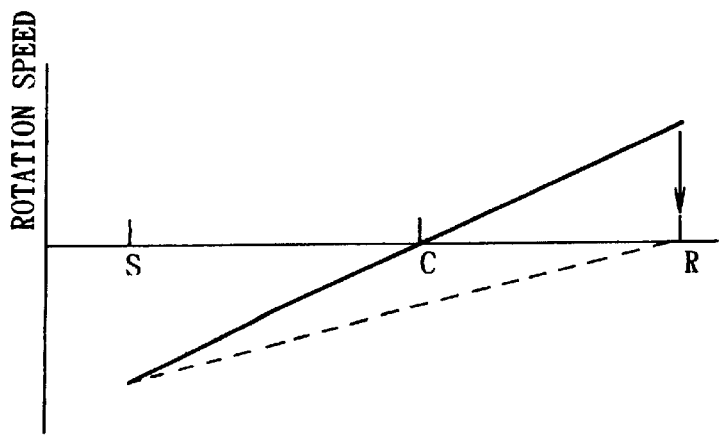
FIG. 5 is a collinear graph showing the relationship among the rotation speeds of the three rotating shafts coupled to the planetary gear FIG. 1.
Figure 6:
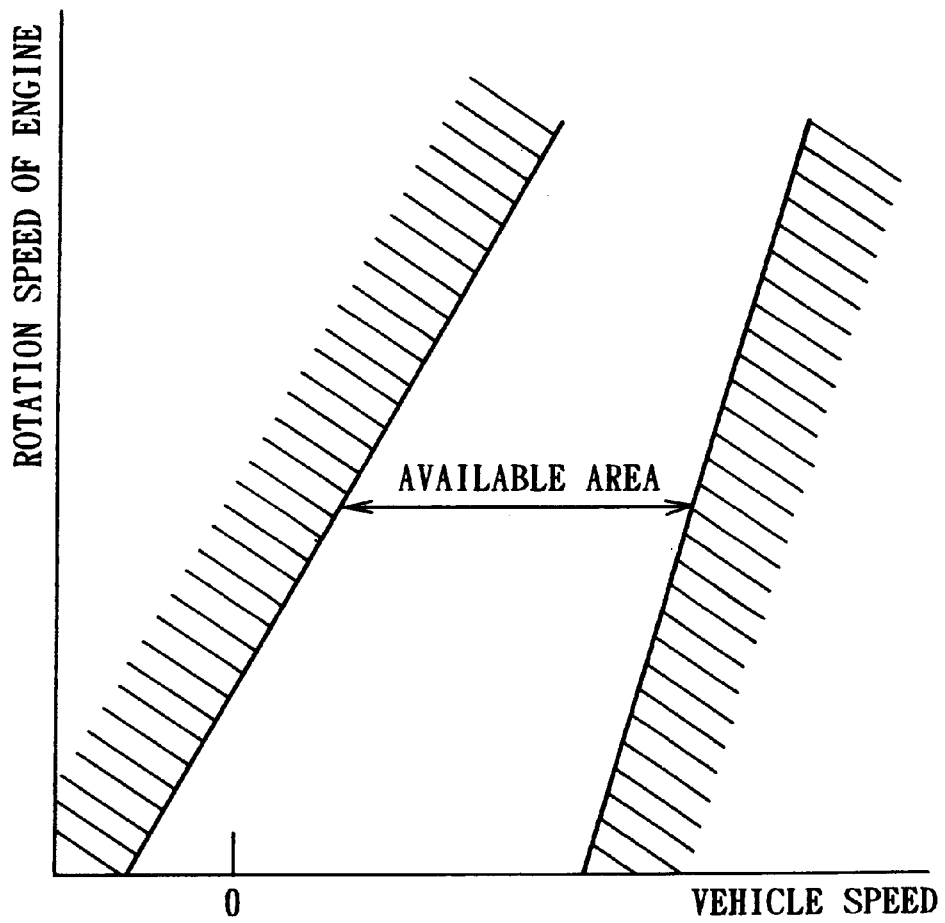
FIG. 6 is a view for explaining the available area of the rotation speed of the engine versus the hybrid vehicle speed.

Incidentally in the hybrid vehicle of this embodiment, the rotation speed of the engine 150 is restricted by a relationship of the vehicle speed. FIG. 6 shows a restriction area and an available area. According to the rotation speed of the engine 150 the available area of the vehicle speed is restricted as shown in FIG. 6. Such a restriction is caused by the restriction of the mechanical relationship concerning the rotation speed of each gear of the planetary gear 120. When the vehicle drives while the engine stops, for example, the collinear graph is shown in FIG. 5 (the planetary carrier 124 stops and C is zero). The above-mentioned gear ratio ρ is less than 1 in the planetary gear 120. Then, the sun gear 121 rotates faster than the ring gear 122. If the rotation speed of the ring gear 122 increases, the rotation speed of the sun gear 121 might be higher than a mechanically limited value. Even if the hybrid vehicle moves at the same speed as mentioned above, the rotation speed of the sun gear 121 is lower according to the rotation speed of the engine 150 when the engine 150 works and rotates. These restrictions are shown in FIG. 6 in the relationship between the rotation speed of the engine and the hybrid vehicle speed on the basis of the movement theory of the planetary gear. Under these restricted conditions, the hybrid vehicle of this embodiment can drive with the engine 150 idling even though the engine 150 does not output power.

All operating conditions of the power output device of this embodiment are controlled by the control device 190. In the control device 190, which is the same as the EFIECU 170, a one-chip micro-computer including CPU, ROM, RAM, etc., are provided, and the control device 190 is connected to the EFIECU 170. Then both the EFIECU 170 and the control device 190 can exchange various kinds of information. The control device 190 can indirectly control the operation of the engine 150 by sending information of the directed torque values and/or the directed rotation speed which are needed for controlling the engine 150, to the EFIECU 170. As a result, the control device 190 controls the operation of all systems 6f the power output device. To achieve this control, various sensors, such as a sensor 144 for detecting the rotation speed of the wheel shaft 112, etc., are provided in the control device 190. In this embodiment, the sensor 144 for detecting a rotation speed of the wheel shaft 112 is on the ring gear shaft 126 and this sensor 144 concurrently plays a role of detecting a rotation speed of the electric motor MG2, because the ring gear shaft 112 and the wheel shaft 112 are mechanically coupled together.

(2) Torque Control Processing

Figure 7:
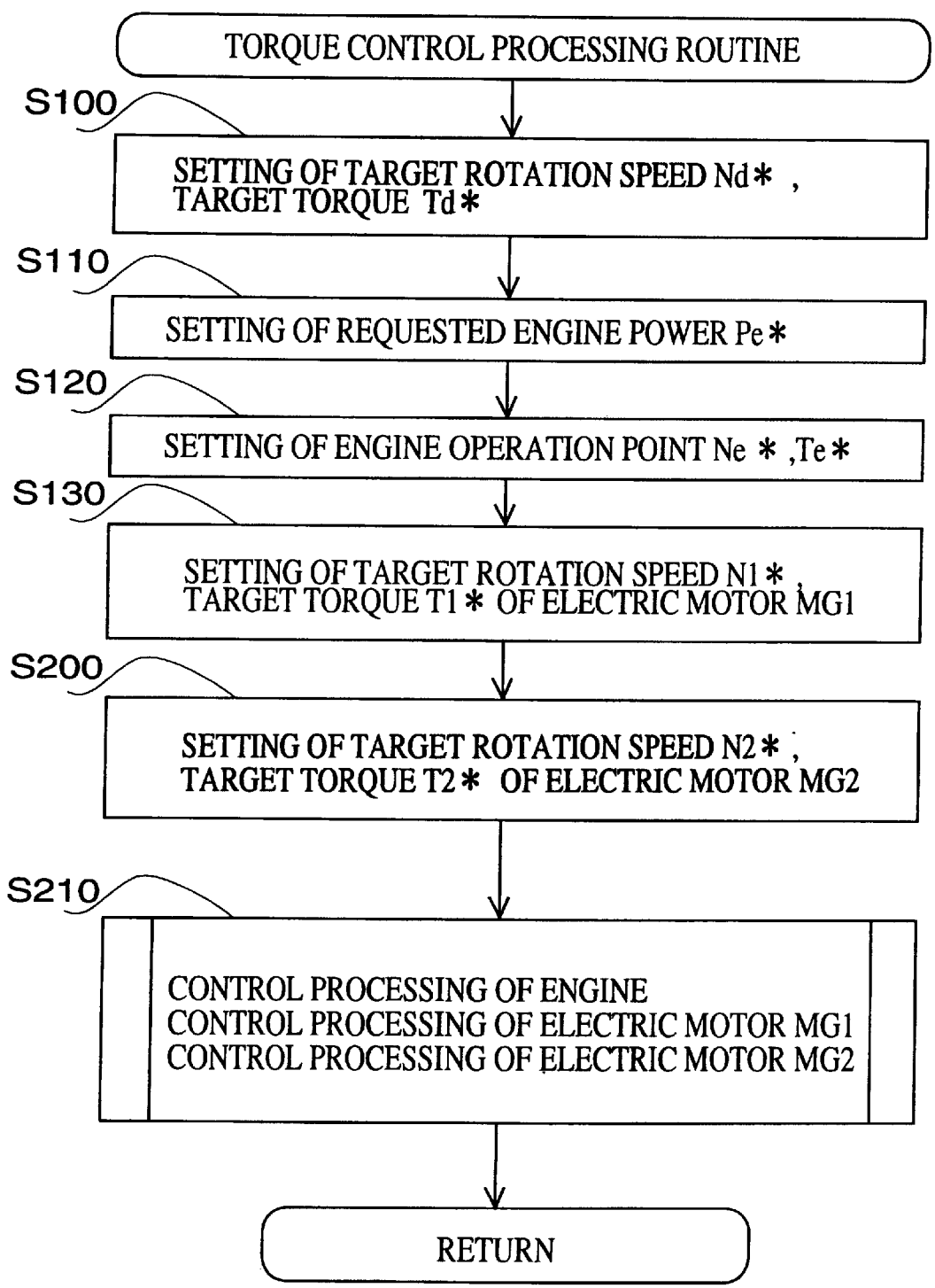
FIG. 7 is a flowchart showing a torque control processing routine according to the embodiment.

The torque control processing of this embodiment will be explained hereinafter. Torque control processing means the processing of controlling the power of the wheel shaft 112, which consists of requested torque and a rotation speed, by controlling the electric motors MG1, MG2, and engine 150. The torque control processing flowchart of this embodiment is shown in FIG. 7. This routine is repeatedly executed at a predetermined interval through time-sharing by the CPU in the control device 190 (hereinafter CPU means only the one in the control device 190).

Once the torque control processing routine starts, the CPU sets the target rotation speed Nd* and the target torque Td* of the wheel shaft 112 (Step S100). The target rotation speed Nd* and the target torque Td* are determined on the basis of the present speed of the vehicle or the pressing degrees of the accelerator pedal or etc. The CPU reads these values in this processing, though this is not illustrated in this figure.

In the next step the CPU determines the requested engine power Pe* of the engine 150 (Step S110). This requested engine power Pe* is given by summing up the driving power, which is the product of the target rotation speed Nd* and the target torque Td*, the electric power charged to or discharged from the battery 194, and the electric power for motoring accessory devices. For example if the surplus electric power needs to be discharged from the battery 194, the requested engine power Pe* of the engine 150 is reduced by the equivalent value. And if the accessory devices, e.g. an air conditioner, need to work, it is necessary for the engine 150 to output the surplus electric power equivalent to the electric power for the accessory devices, thus adding to the driving power.

After the requested engine power Pe* is once set in these steps, the CPU sets the engine operation point, that is the target rotation speed Ne* and the target torque Te*. The operation point of the engine 150 is basically selected in the efficiency map illustrated in FIG. 9 so that the operating efficiency is the highest.

Figure 8:
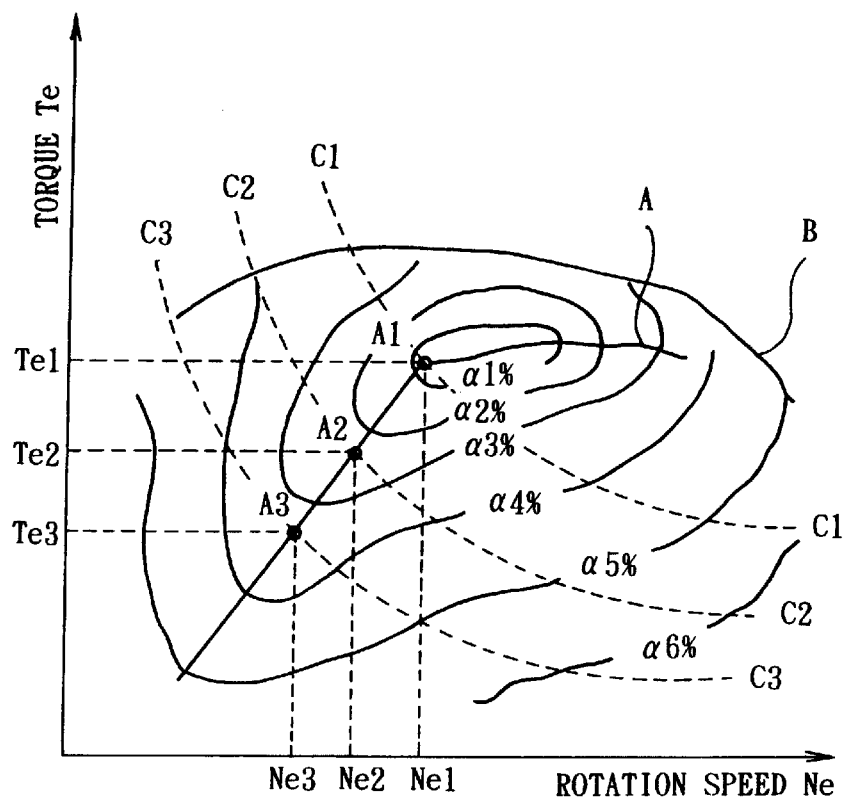
FIG. 8 is a graph showing the relationship between the torque Te and the rotation speed Ne of the engine.

The relationship between an operation point and an efficiency of the engine 150 is illustrated in FIG. 8. The curved line B shows the limited available line of the rotation speed Ne and the torque Te of the engine 150. Each line α1, α2, etc. in FIG. 8 shows the line on which the efficiency of the engine 150 is the same value. α1 is the efficiency of the line α1, and α2, α3, etc., are the same as α1. α1 is bigger than α2, α2 is bigger than α3 and so on (α1>α2, α2>α3, α3>α4, etc.). As shown in FIG. 8, the engine 150 has a characteristic that the efficiency of the restricted area of the operation point is high and the efficiency of the engine operation point is lower when the operation point is located in the area farther from the above-mentioned restricted area.

Figure 9:
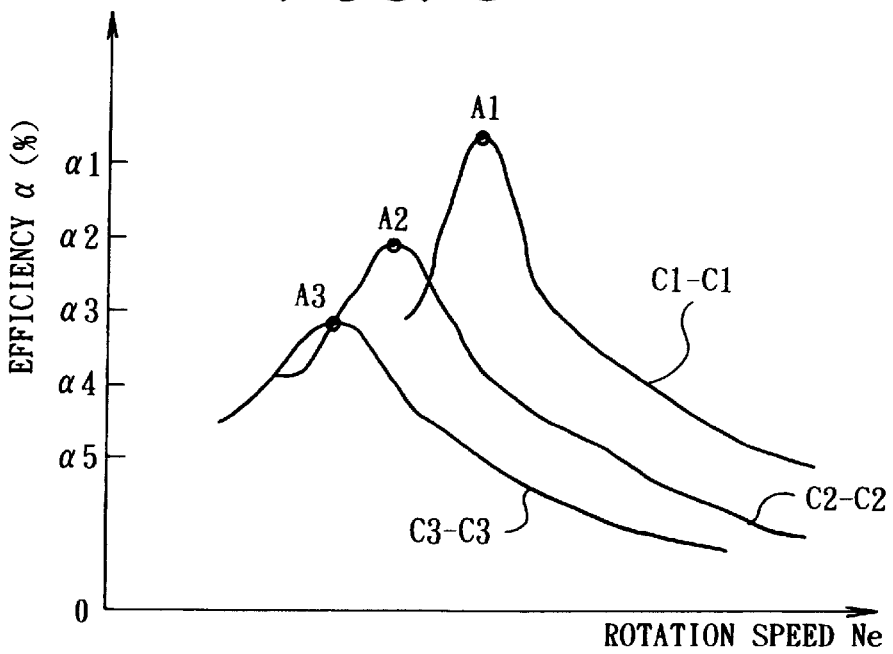
FIG. 9 is a graph showing the relationship between the efficiency α and the rotation speed Ne of the engine.

In FIG. 8, the dotted curved lines C1—C1, C2—C2, C3—C3 respectively mean the same power outputted from the engine 150. The operation point of the engine 150 is selected from the curved lines, according to the requested power. Among the dotted curved lines, C1—C1, C2—C2, C3—C3, in order, the requested power is lower. When the requested power Pe* to the engine 150 is on the curved dotted line C1—C1, for instance, the operation point of the engine 150 is determined on the point A1 on which efficiency is the highest. In the same way, the point A2 is selected on the line C2—C2, and the point A3 is set on the line C3—C3. The relationship between the efficiency a and the rotation speed Ne of the engine 150 on the dotted curved lines C1—C1, C2—C2, and C3—C3 is illustrated in FIG. 9. Incidentally, in FIG. 9 only three lines are shown corresponding to the three lines in FIG. 8 for the convenience of the explanation. But these lines can be drawn indefinitely responsive to the requested power, and operation points, e.g. A1, A2, etc. can be selected indefinitely. The curved line A in FIG. 8 is drawn by linking the points on which efficiency is substantially highest. This is called the operation curve.

When the requested power Pe* is zero, the engine 150 stops or is idling. Such a condition occurs when the hybrid vehicle drives only by the power from the electric motor MG2 or when the vehicle moves down a downward slope. Whether the engine 150 stops or is in an idling-condition is determined based on the various conditions. On the basis of the above-explained available area in FIG. 6, the engine 150 is in the idling-condition when the vehicle drives at rather high speed. Furthermore the engine 150 is controlled to be in the idling-condition when it is determined that a warming-up of the engine 150 is needed.

On the basis of the operation point of the engine 150, which is determined by the aforementioned control processing, the CPU determines the target rotation speed N1* and the target torque T1* of the electric motor MG1 (step S130). Since the target rotation speed Ne* of the engine 150, which is equal to the rotation speed of the planetary carrier shaft 127, and the target rotation speed Nd* of the wheel shaft 112, which is equal to the rotation speed of the ring gear shaft 126, have been already determined, the target rotation speed N1* of the electric motor MG1, which is equal to the sun gear shaft 125, can be determined using the collinear graph illustrated in FIG. 2. Consequently, in the step S130, the target rotation speed N1* of the electric motor MG1 is determined by the proportional calculation expression introduced from the collinear graph in FIG. 2.

The target torque T1* of the electric motor MG1 is basically determined by the proportional integral control.

Figure 10:
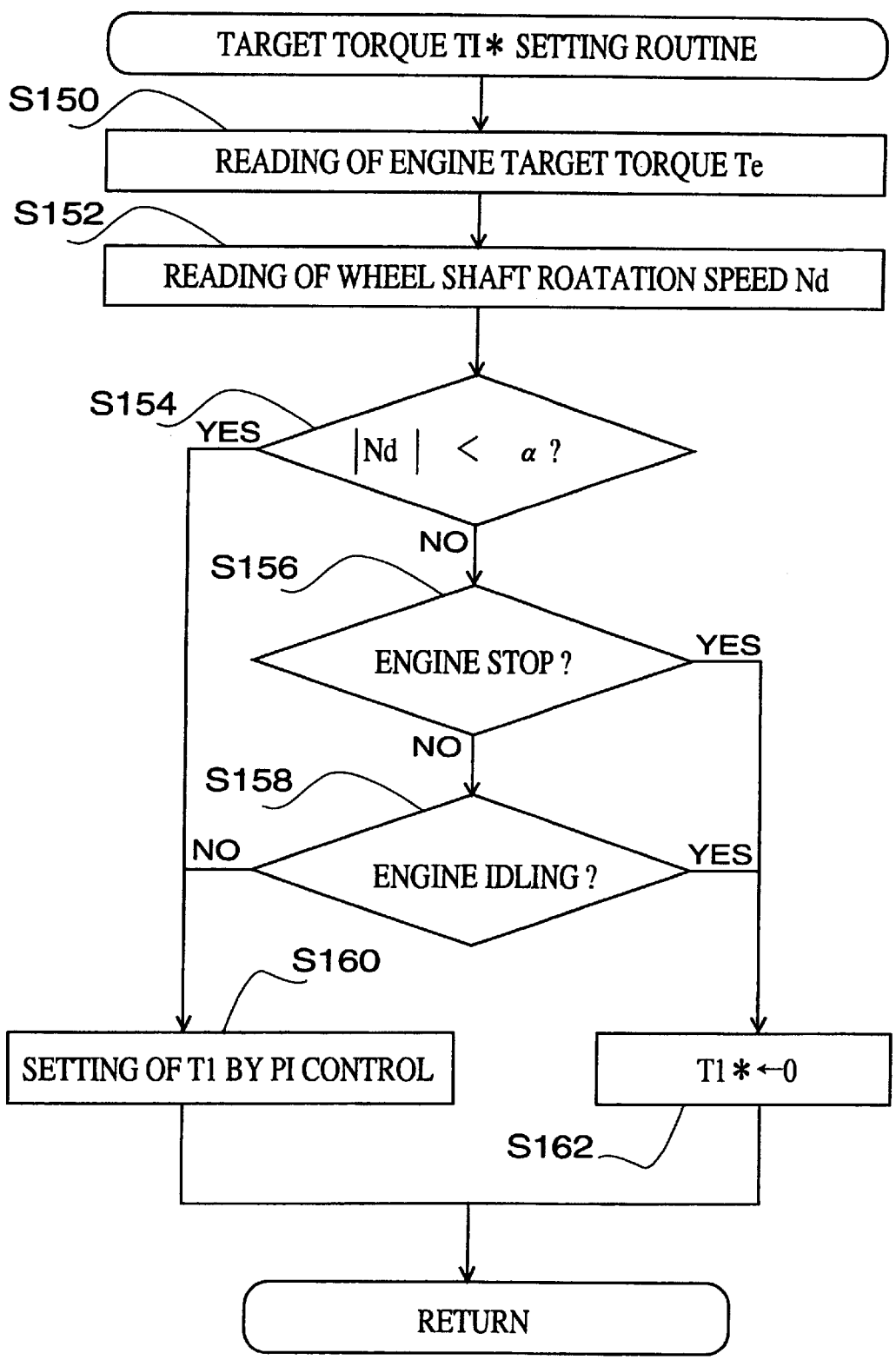
FIG. 10 is a flowchart of the target torque T1* setting routine according to the embodiment.

However, in this embodiment the target torque T1* is determined by considering the further conditions. The flowchart of the target torque T1* setting the routine of the electric motor MG1 is shown in FIG. 10.

In this routine, first, the target torque Te* of the engine 150 is given. (step S150). This target torque Te* is the value which is determined in the step S120 in FIG. 7. Next, the rotation speed Nd of the wheel shaft 112 is read (step S152). This rotation speed. Ne can be read by the rotation speed sensor 144 illustrated in FIG. 1. In this embodiment, the sensor 144 detects the rotation speed of the ring gear shaft 126. Actually the rotation speed of the wheel shaft 112 is not the same as the rotation speed of the ring gear shaft 126 because gears are provided in the power train from the ring gear shaft 126 to the wheel shaft 112. However, the rotation speed Nd of the wheel shaft 112 is proportional to the value detected by the sensor 144. This value can then be treated as the rotation speed Nd.

Figure 3:
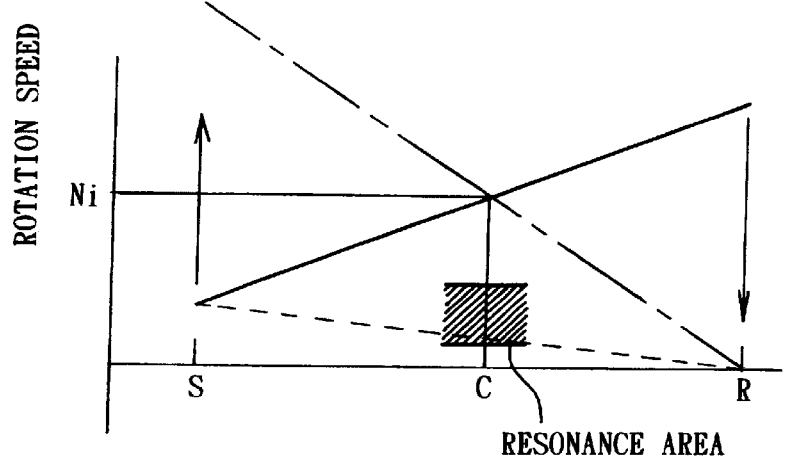
FIG. 3 is a collinear graph showing the relationship among the rotation speeds of the three rotating shafts coupled to the planetary gear in FIG. 1.

The CPU determines whether an absolute value of the rotation speed Nd is less than a predetermined value α or not (step S154). By this processing whether the wheel shaft 112 is locked or not is determined. The predetermined value α is a criterion value which can determine whether the wheel shaft 112 is locked or not. This value can be set by considering the gear ratio of the gears in the power train. The absolute value of Nd is used because it can be available not only for forward-driving of the vehicle but also for reverse-driving. As illustrated in FIG. 3 the area in which the engine resonance vibration occurs has a certain margin. Consequently it is desirable that the predetermined value α is determined according to the margin value of the resonance vibration area. In this embodiment, the case that the absolute value of the rotation speed Nd is lower than the predetermined value α is called the lock of the wheel shaft 112 for convenience of explanation. Even though the wheel shaft 112 rotates at low rotation speed, the lock condition, as above-defined, of the wheel shaft 112 can occur according to the value α.

When the absolute value of the rotation speed Nd is less than the predetermined value α, i.e. when the wheel shaft 112 is determined to be locked, the target torque T1* of the electric motor MG1 is determined by the proportional integral control. This is shown as PI control in FIG. 10 (step S160). Proportional integral control, or PI control is used in the field of the control technology. Generally, in a feedback loop in an automatic control device, a feedback value is controlled to reach a target value by comparing the feedback value and the target value, and by considering the proportional value responsive to the difference between both values and the integral value of the differences.

On the basis of a deviation between the present rotation speed of the electric motor MG1 and the above-mentioned target rotation speed N1*, the target torque T1* is determined. When the present rotation speed of the electric motor MG1 is lower than the target rotation speed N1*, the target torque T1* is determined to be a positive value. On the contrary, when the present rotation speed is higher than the target rotation speed, the target torque T1* is determined to be a negative value.

When the absolute value of the rotation speed Nd is bigger than the predetermined value α, that is, when the wheel shaft 112 is determined not to be locked, the CPU determines whether the engine 150 works or not (step S156), and whether the engine 150 is idling or not (step S158). When the engine 150 is determined to stop or idle, the target torque T1* of the electric motor MG1 is determined to be zero (step S162). On the other hand, when the engine 150 is determined not to stop and not to idle, the target torque T1* of the electric motor MG1 is determined by the PI control (step S160). Therefore, the target torque T1* of the electric motor MG1 is once determined, and the target torque T1* setting routine finishes andy returns to the torque control processing routine.

Based on the operation point of the engine 150 and the electric: motor MG1 determined by the above-mentioned processing, operation points of the electric motor MG2, the target rotation speed N2* and the target torque T2*, are determined (step S200). The target rotation speed N2* of the electric motor MG2 is determined on the basis of the collinear graph in FIG. 2. The target rotation speed N2* is equal to the target rotation speed Nd* of the ring gear shaft 126. The target torque T2* is determined by the PI control.

According to the operation points determined by this processing, the CPU controls the operations of the electric motors MG1, MG2 and the engine 150 (step S210). On the respective electric motors MG1, MG2, voltages to the three-phase coils of the electric motors MG1, MG2 are applied responsive to the determined target rotation speed, and the determined target torque and the switching of the transistors in the drive circuits 191, 192 are executed on the basis of deviations between the above-mentioned voltages and the present voltages. Because a method for controlling synchronous motors is publicly well known, detailed explanations will be omitted in this specification.

Concerning the engine 150, a method for controlling it following the determined operation point is also well known. Explanations will thus be omitted. Since the control of the engine 150 is actually executed by the EFIECU 170, necessary information, e.g. the operation point, is sent from the control device 190 to the EFIECU 170 in the processing step S210 in the torque control processing routine. By sending such information the CPU in the control device 190 controls indirectly the operation of the engine 150. Incidentally when the engine 150 is in the idling condition, the rotation speed of the idling condition is controlled to be kept at a predetermined idling rotation speed according to a temperature of the engine 150 in a range between 1000 and 1300 rpm.

In the power output device explained above, by controlling the target torque T1* to be zero when the engine 150 stops or is idling, the phenomenon that the electric motor MG1 sometimes is motoring or in other times regenerating responsive to the fluctuation of the rotation speed of the electric motor MG1 caused by the fluctuation of the rotation speed of the engine 150 or the vibration of the power output device can be avoided. In addition, the phenomenon that the operating condition of the engine 150 becomes unstable because of the interaction between the control of the engine 150 and the control of the electric motor MG1 can also be avoided. Furthermore, the phenomenon that the battery 194 is over-charged or over-discharged by the operation of the electric motor MG1 can be avoided. Incidentally, these advantages could be attained even if the determination of the step 154 in FIG. 10, that is, whether the wheel shaft 112 is locked or not, is omitted.

In this embodiment as depicted in FIG. 10, when the wheel shaft 112 is locked, the torque of the electric motor MG1 is determined by the PI control, even though the engine 150 stops or is idling (step S160). As shown in FIG. 3, for instance, when the vehicle is driving with the engine 150 idling at the rotation speed Ni, the relationship of the rotation speed of the three rotating shafts is given by a solid operational co-line. When the rotation speed of the ring gear shaft 126 happens to be lower, that is, for example, when the wheels are locked, the operational co-line changes immediately to the dotted line as shown in FIG. 3, if the torque of the electric motor MG1 is zero, because the inertia of the electric motor MG1 is rather large and its rotation speed can not change quickly. In these cases, the operation condition of the power output device becomes unstable, because the rotation speed of the engine 150 enters a resonance area illustrated in FIG. 3. In the power output device of this embodiment, the electric motor MG1 is controlled to output the torque which makes the engine 150 keep the same present rotation speed and the torque is determined on the basis of the collinear graph in FIG. 3. Then, the operational co-line changes to the chained line and the rotation speed of the engine 150 maintains substantially the same value. Consequently, the power output device can be operated at the stable condition. Furthermore, even if the rotation speed of the engine 150 enters the resonance area, it exits the resonance area quickly and smoothly.

Figure 4:
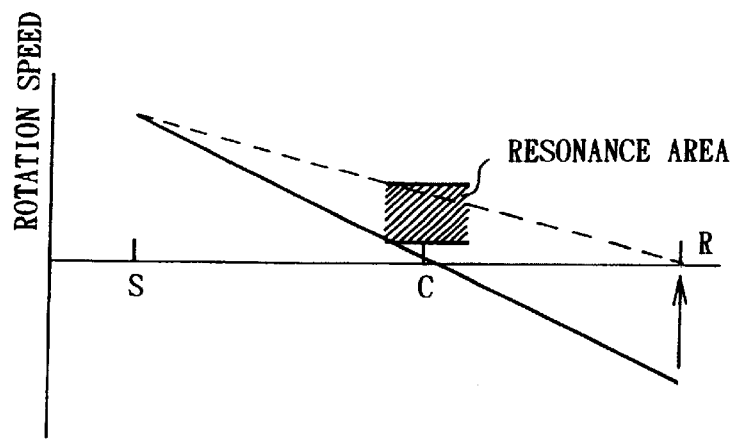
FIG. 4 is a collinear graph showing the relationship among the rotation speeds of the three rotating shafts coupled to the planetary gear in FIG. 1.

These resonance phenomena also occur when the engine 150 does not work. In FIG. 4, the solid operational co-line shows a case that the ring gear 126 rotates at the reverse direction with the engine 150 not working. This means that the hybrid vehicle reverses The dotted line in FIG. 4 shows a case that the rotation of the ring gear shaft 126 becomes zero. As understood by FIG. 4, the rotation speed of the engine 150 could enter the resonance area, because it increases.

Furthermore other cases such as that the engine 150 reverses could occur. The solid operational co-line in FIG. 5 shows that the ring gear shaft 126 rotates at normal direction while the engine 150 does not work. A case that the rotation speed of the ring gear shaft 126 becomes zero in the above-mentioned condition is illustrated by the dotted operational co-line in FIG. 5. As shown in this figure, the rotation of the engine 150 might reduce and begin to reverse. These aforementioned phenomena could occur in various kinds of power output devices, not only the power output device of this embodiment, but also in power output devices where an engine and a drive shaft are mechanically connected and can rotate with a certain relationship between both rotation speeds.

As mentioned above, in such a case that the wheel shaft 112 locks when the vehicle reverses with the engine stopping (shown in FIG. 4) or when the vehicle drives forward and the wheel shaft 112 is locked (shown in FIG. 5), the phenomenon that the engine 150 enters the resonance area or rotates reversely can be avoided by outputting the torque from the electric motor MG1. Consequently in such a case as when the engine 150 outputs substantially zero torque, the power output device can realize a stable operating condition.

In the target torque T1* setting routine in this embodiment, when the wheel shaft 112 is locked, a predetermined torque is outputted from the electric motor MG1 (step S154, S160). Once the lock of the wheel shaft 112 is released after it is locked while the engine stops or is idling, the target torque T1* of the electric motor MG1 is immediately determined to be zero. On the other hand, such a method is possible as predetermined torque of the electric motor MG1 continues to be outputted until a predetermined time passes after the lock of the wheel shaft 112 is released. Just after the lock is released, it is highly likely that the lock condition occurs again. A more stable operation condition is then realized by the above-mentioned method where the torque of the electric motor MG1 continues to be outputted until the rotation speed of the wheel shaft 112 gets to be sufficiently stable. But if the predetermined time is too long, a problem caused by the control of the electric motor MG1 might occur. Then the predetermined time is decided on the basis of results of experiments or other things by considering the possibilities of the repeated lock of the wheel shaft 112 and the problem caused by the control of the electric motor MG1. Incidentally, this predetermined time does not have to be decided on the basis of time. For example, it can be decided on the basis of a number of the execution steps in the torque control processing routine.

In this embodiment, the predetermined value $\alpha$, that is the criterion whether the wheel shaft 112 is locked or not, is set to be constant. On the contrary, the predetermined value $\alpha$ could be variable responsive to the vehicle speed. As illustrated in FIG. 3, the determination whether the engine 150 enters the resonance area or not when the wheel shaft 112 is locked, is effected by the rotation speed of the sun gear 121. For example, if the vehicle speed is lower and the rotation speed of the sun gear 121 is higher than the condition as shown by the solid line of the operational co-line in FIG. 3, and the wheel shaft 112 is locked, the rotation speed of the engine 150 becomes lower, but it is possible that the engine 150 does not enter the resonance area. Consequently, if a map which determines the predetermined value $\alpha$ responsive to the vehicle speed is provided and the value $\alpha$ is variable according to the vehicle speed, the operation condition of the hybrid vehicle can be appropriately controlled.

Figure 11:
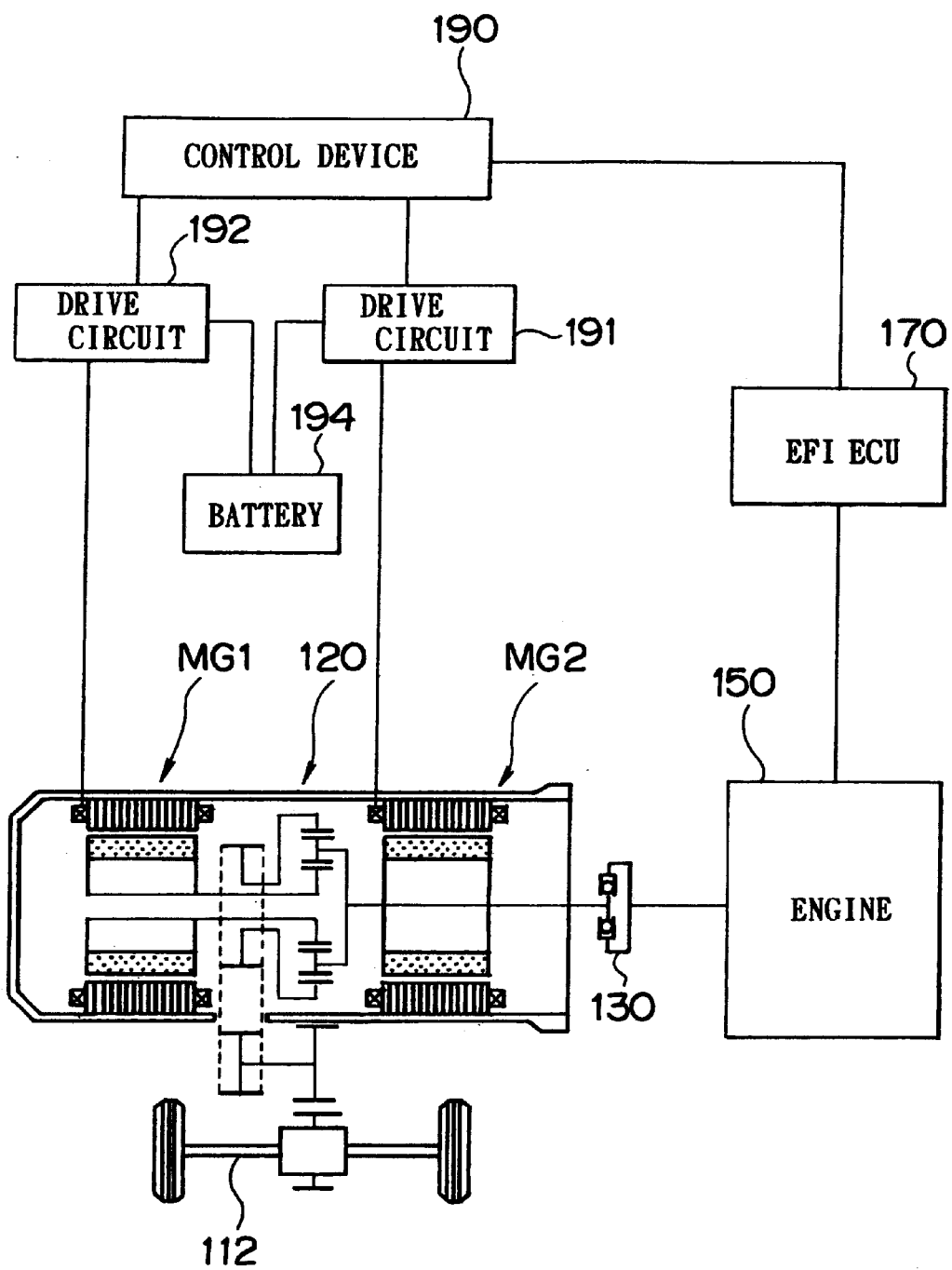
FIG. 11 is a schematic illustration of the overall structure of another type of a power output device which is mounted to a hybrid vehicle.

Other various kinds of structures, except the structure illustrated in FIG. 1, are applicable for the hybrid vehicle applied to this invention. In FIG. 1 the electric motor MG2 is coupled to the ring gear shaft 126. A structure in which the electric motor MG2 is not coupled to the ring gear shaft 126, however, is also appropriate. Furthermore a structure in which the electric motor MG2 is coupled to the crank shaft 156 of the engine 150 is also applicable. Such an example is shown in FIG. 11. In this figure the coupling condition of the electric motor MG1, MG2 and the engine 150 to the planetary gear 120 is different from the embodiment illustrated in FIG. 1. From the view point that the electric motor MG1 is coupled to the sun gear 121 of the planetary gear 120, and the crank shaft 156 of the engine 150 is coupled to the planetary carrier 124, the structure shown in FIG. 11 is the same as the one in FIG. 1. But there is a difference between the above-mentioned two structures. In FIG. 11, the electric motor MG2 is not coupled to the ring gear 122, but coupled to the crank shaft 156 of the engine 150 through the damper 130. In this structure as shown in FIG. 11, the rotation speed of the engine 150 is also affected by a fluctuation of the rotation speed of the wheel shaft 112. This invention can then be applied to this structure. Incidentally in the structure illustrated in FIG. 11, the present invention can be applied to this structure by a method of setting the torque of the electric motor MG2 through the same processing as shown in FIG. 10, and in the same way by using a method of setting the torque of the electric motor MG1.

While the present invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention. For example, the power output device according to the embodiments is also applicable to transportation means such as ships and aircraft and a variety of other industrial machines.

What is claimed is:

1. A power output device comprising:

an internal combustion engine having an output shaft;

an electric motor for generating and receiving electric power and for rotating a rotation shaft;

a drive shaft mechanically connected to the output shaft of said internal combustion engine and the rotation shaft of said electric motor for rotating at the same rotation speed as or a different rotation speed from the output shaft;

a battery for supplying electric power to said electric motor and for storing electric power from said electric motor;

a torque determinater for determining output torque of said internal combustion engine and for relating the output torque to a requested power;

an electric motor controller that feedback-controls said electric motor so that the output power from said drive shaft is equal to the requested power; and a second electric motor controller that controls said electric motor so that the output torque of said electric motor is substantially zero when the output torque of said internal combustion engine is substantially zero.

2. The power output device according to claim 1, further comprising a prevention determinater that determines whether or not an operating condition of said internal combustion engine should be avoided on the basis of the operating condition of said internal combustion engine, said electric motor and said drive shaft, wherein said second electric motor controller controls said electric motor so that the output torque of said electric motor is substantially zero when the output torque of said internal combustion engine is substantially zero and the operating condition of said internal combustion engine does not need to be avoided.

3. The power output device according to claim 2, wherein said prevention determinater includes rotation detecting means for detecting rotation speed of said drive shaft and prevention determining means for determining whether or not an operating condition of said internal combustion engine shouldbe avoided on the basis of the operation speed of said internal combustion engine.

4. The power output device according to claim 3, wherein said prevention determinater determines the operating condition of said internal combustion engine to be avoided until a predetermined time passes after the rotation speed of said internal combustion engine departs from the rotation speed to be avoided once the operating condition of said internal combustion engine is determined to be avoided.

5. The power output device according to claim 1, further comprising a planetary gear mechanically connecting together the output shaft of said internal combustion engine, the rotation shaft of said electric motor, and said drive shaft.

6. A control method for a power output device having an internal combustion engine with an output shaft, an electric motor for generating and receiving electric power and for rotating a rotation shaft, a drive shaft mechanically connected to the output shaft of said internal combustion engine and the rotation shaft of said electric motor for rotating at the same rotation speed as or a different rotation speed from the output shaft, and a battery for supplying electric power to said electric motor and for storing electric power from said electric motor, comprising:

determining output torque of said internal combustion engine and relating the output torque to a requested power;

feedback-controlling said electric motor so that the output power from said drive shaft is equal to the requested power; and controlling said electric motor so that the output torque of said electric motor is substantially zero when the output torque of said internal combustion engine is substantially zero.

7. The control method of a power output device according to claim 6, further comprising:

detecting a parameter indicating the operating condition of said power output device;

determining whether or not an operating condition of said internal combustion engine should be avoided on the basis of said parameter;

controlling said electric motor so that the output torque of said electric motor is substantially zero when the output torque of said internal combustion engine is substantially zero and an operating condition of said internal combustion engine does not need to be avoided.

8. A hybrid vehicle with a wheel shaft driven by a power output device comprising:

an internal combustion engine having an output shaft;

an electric motor for generating and receiving electric power and for rotating a rotation shaft;

a drive shaft connected to said wheel shaft and mechanically connected to the output shaft of said internal combustion engine and the rotation shaft of said electric motor for rotating at the same rotation speed as or a different rotation speed from the output shaft;

a battery for supplying electric power to said electric motor and storing electric power from said electric motor;

a torque determinater for determining output torque of said internal combustion engine and for relating the output torque to a requested power;

an electric motor controller that feedback-controls said electric motor so that the output power from said drive shaft is equal to the requested power;

a lock determinater that determines whether said wheel shaft is locked or not; and a second electric motor controller that controls said electric motor so that the output torque of said electric motor is substantially zero when the output torque of said internal combustion engine is substantially zero.

9. The hybrid vehicle with a wheel shaft driven by a power output device according to claim 8, further comprising a prevention determinater that determines whether or not an operating condition of said internal combustion engine should be avoided on the basis of the operating condition of said internal combustion engine, said electric motor and said drive shaft, wherein said second electric motor controller controls said electric motor so that the output torque of said electric motor is substantially zero when the output torque of said internal combustion engine is substantially zero and the operating condition of said internal combustion engine does not need to be avoided.

* * * * *